May 19, 1970     H. I. GLASER ET AL     3,512,948
APPARATUS FOR PROCESSING HEAT-SOFTENED MINERAL MATERIAL
Filed March 23, 1967     2 Sheets-Sheet 1

HELLMUT I. GLASER
WALTER L. MARTIN &
MICHAEL S. MITCHAM
INVENTORS

BY
*Staelin & Overman*
ATTORNEYS

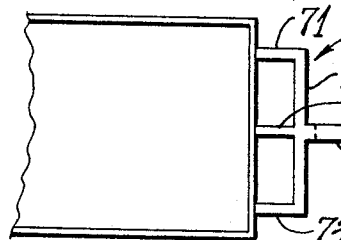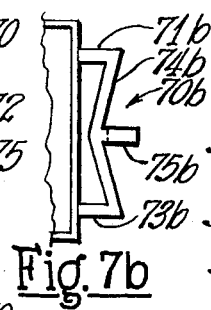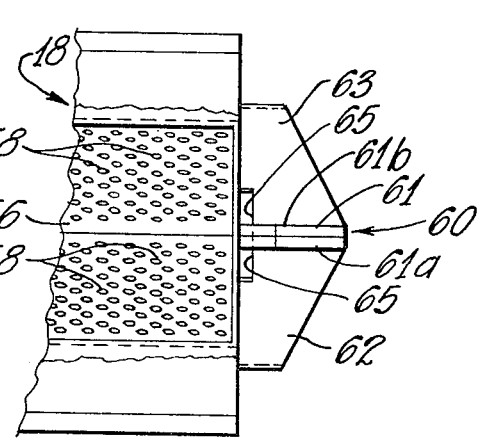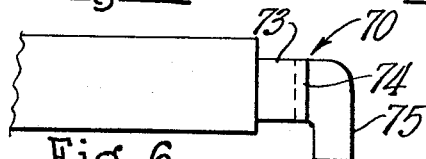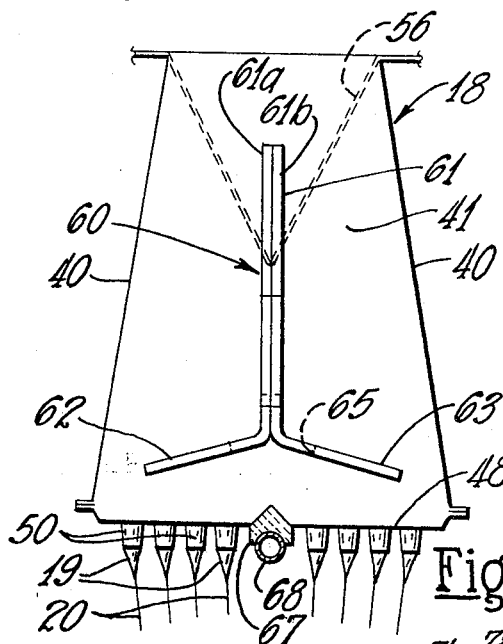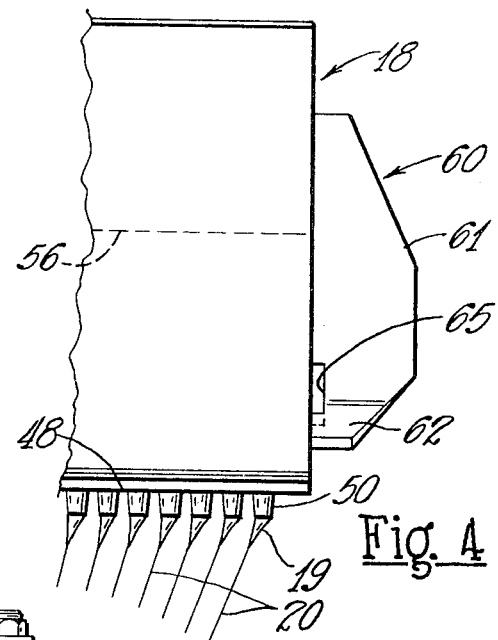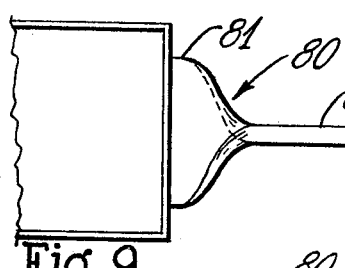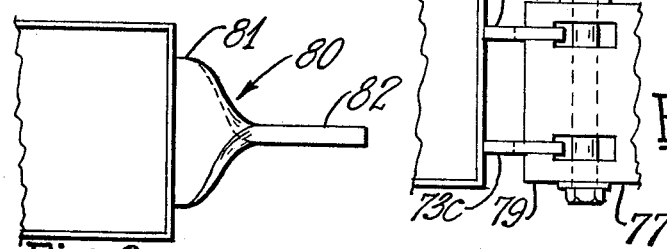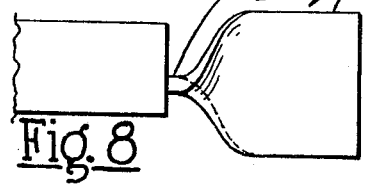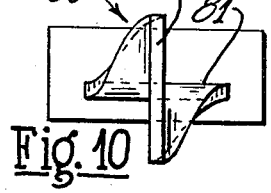
HELLMUT I. GLASER
WALTER L. MARTIN &
MICHAEL S. MITCHAM
INVENTORS
BY
Staelin + Overman
ATTORNEYS United States Patent Office 3,512,948
Patented May 19, 1970

3,512,948
APPARATUS FOR PROCESSING HEAT-SOFTENED MINERAL MATERIAL
Hellmut I. Glaser, Newark, Ohio, Walter L. Martin, Anderson, S.C., and Michael S. Mitcham, Newark, Ohio, assignors to Owens-Corning Fiberglas Corporation, a corporation of Delaware
Filed Mar. 23, 1967, Ser. No. 625,337
Int. Cl. C03b 37/08, 5/02
U.S. Cl. 65—11 18 Claims

ABSTRACT OF THE DISCLOSURE

Apparatus for attaining and maintaining a uniformity of temperature of streams of glass being delivered by a stream feeder for attenuation into filaments or fibers. Novel terminals effect a uniform distribution of electrical energy along a bottom wall of a feeder by establishing an equipotential line parallel to a line defined by the junction of the end and bottom walls. Further distribution control for desired heating may be obtained by the combination of a particular structural configuration of a stream feeder having converging side walls and an inverted Y-shaped terminal. This feeder may have a heater conditioner disposed in the upper portion thereof.

Several methods have heretofore been employed in processing glass for forming attenuated filaments or fibers. One method involves the steps of melting glass in a comparatively large furnace, refining the glass in a refining chamber, and forming the glass into spherical bodies or marbles. The glass marbles are subsequently delivered into a stream feeder or bushing which is electrically heated to remelt the glass to a viscosity at which the streams of glass are flowed through orifices in the bushing and the glass of the streams attenuated into filaments by winding a strand of the filament on a rotating collector. This method is costly as it involves special apparatus for handling and feeding the glass marbles and requires large amounts of electrical energy in remelting the marbles.

Recent developments have been made wherein glass batch is reduced to a molten state and refined in a furnace and the molten glass flows through a forehearth channel to stream feeders or bushings disposed along the forehearth and the streams of the glass delivered through orifices in the feeders or bushings and attenuated into filaments by winding a strand of the filaments upon a rotating collector. This latter process is referred to as a direct melt process. In the direct melt process in the melting and refining of the glass by the application of heat, the temperature of the molten glass is brought to a temperature that is comparatively high in order to effect refining of the glass. During this process of melting and refining of glass, gases and volatiles are emitted or driven off from the melt. This action of melting and refining the glass at elevated temperatures renders the glass substantially stable for any temperature less than the maximum melt temperature in the furnace. Heretofore in the direct melt process, the temperatures of the glass in the forehearth channel and the stream feeders or bushings are substantially lower than the temperature of the melt in the furnace. Thermal, physical and chemical inhomogeneities tend to occur in the transport of the glass in the forehearth channels through heat losses at the refractory sides and contact with the sides tending to contaminate the glass with refractory cords. Frequent filament breakouts, formation of nonuniform filaments and other difficulties have been encountered which are believed attributable at least in part to such inhomogeneities in bushings or stream feeders disposed along the forehearth and supplied with glass from the forehearth channel. In stream feeders or bushings conventionally used along a forehearth channel, temperature upsets and inhomogeneities of the glass cannot adequately be correct or abated in a comparatively short time that the glass is resident in the feeder or bushing. To overcome this problem a comparatively deeper bushing or feeder has been used and the glass in the feeder or bushing has been reheated to a temperature approaching but not exceeding the maximum original melt temperature to recondition the glass.

Heretofore, in the direct melt process being discussed the glass was flowed from a forehearth into each bushing through a substantially large rectangular-shaped open area usually of substantially the same area or larger than the tip section area of the bushing or stream feeder receiving the glass. However, with the reheating of the glass in the stream feeder or bushing and with the connection of several such bushings along the length of the forehearth, difficulties have been encountered in endeavors to stabilize the thermal characteristics of the glass in several bushings. Variations in the temperature of the glass in the forehearth are transferred to the bushings or stream feeders by reason of the large area of open flow passage into each bushing, a condition referred to as "thermal cross-talk."

Thus temperature upsets of the glass in the forehearth are transmitted to the bushings and thermal differences in the bushings are readily transferred to adjacent bushings through the glass in the forehearth channel. For example, if one bushing becomes inoperative or is taken out of service, the temperature of the glass in the forehearth is affected thereby. Radiant energy from the glass in one bushing interacts on other bushings. Each bushing is under the influence of radiant energy from the glass in the forehearth and temperature variations in the forehearth sets up thermal interference in the bushings and vice versa. In the improved version of the direct melt process the forehearth channel and each of the bushings constitutes separate thermal environments or systems which should be kept comparatively as isolated as possible. In the glass processing system of this character, variations in viscosity and other characteristics of the glass in the several bushings results in nonuniform streams flowing from the bushings, and filaments or fibers attenuated from the streams are not uniform in size and have varying strength characteristics. Where the system is employed for producing fine filaments for textile uses, it is imperative that the filaments from the several bushings be of uniform size for the production of commercially acceptable textiles.

Efforts have been made to solve this latter problem by providing a restricted flow passage between the forehearth channel and the stream feeder or bushings. This has substantially reduced thermal interference or interaction between adjacent bushings and/or the forehearth channel to more nearly stabilize the operating characteristics of each bushing. However, this reduction of the thermal interaction problem gave rise to new requirements in bushings.

In using prior art bushings which had as a standard bottom walls with orifice means formed therein and having a larger bottom wall area than the restricted flow passage, the sides of the bushings have commonly extended vertically from the bottom wall or even diverged away from each other as they extend upwards. Stagnant pockets of glass occur in the upper corners of these bushings which are heated over a long period and lose desirable characteristics. Flow problems in the standard bushings cause eddy currents and other disturbances in the thermal characteristics of the glass in the bushing and have been made them less desirable for use in the applications discussed above. Since the restricted flow passage is smaller than the top opening of the bushing, erosion of the edges of the refractory forming the flow passage occurs causing the glass to have undesirable characteristics. Air must be properly pushed out of the bushing when it is first being filled with molten glass so that it does not interfere with the processing of the glass. In past bushings the air may become trapped in a pocket and either cause undesirable local thermal pockets which disturb the uniformity of the temperature in the bushing or tend to leak out of the air pockets in small bubbles which again causes nonuniformities and local thermal disturbances. Further, the flow characteristics of the molten glass from the forehearth through the restricted flow passage down the bushing to the orificed bottom wall is such that unequal velocity gradients occur horizontally across the bushing resulting in nonuniform characteristics of the glass adjacent the bottom wall and thus affecting the uniformity of the filaments or fibers and the strength characteristics thereof.

In addition to the special uses of bushings with the restricted flow passages as discussed above, it is desirable to increase the number of filaments that may be drawn from any bushing or feeder station. Engineering experience for the construction of bushings or stream feeders to date has indicated that there is a limitation on the number of orifices or orificed tips that may be formed in a unit area. Therefore, if it is desired to increase the production from a single feeder station it is necessary to enlarge the bottom wall or the tip section area of a feeder. Presently, forehearths have been designed in limited widths or sizes for the most efficient heating and conditioning. Therefore, even if other methods obtained for restricting the thermal interaction between the forehearth channel and the bushing so that the flow passage between the channel of the forehearth and the bushing need not be restricted, the width of the forehearth channel itself becomes a limiting factor. Thus, if it were desired to increase production of a feeder station, the flow passage between the forehearth channel and the bushing would still be relatively restricted in that the width or cross-sectional dimensions of the flow passage would be less than that of the tip section or bottom wall of the bushing. Then the problems discussed hereinbefore with respect to a restricted flow passage would be equally applicable.

Thus in recent developments a new family of bushings have emerged which have a greatly increased tip section area to increase the production of fibers or filaments from a single station. To solve the problems set forth hereinbefore these bushings have been formed with upwardly extending side walls that converge toward each other to define a top opening which is substantially equal in dimensions to that of the flow passage of the forehearth. In order to further condition the glass in these bushings a conditioner means such as a heater screen member is disposed in the upper portion of the bushing. This new family of bushings with the particular structural characteristics discussed above thus present difficulties in properly distributing electrical energy through the bushing to provide the desired heating effects in particular areas.

In addition to the new family of bushings discussed above there have been developments in general to increase the production of filaments from a single feeder station which have entailed the general enlargement of the feeder tip section area because of the limitations on the number of orifices or orificed tips per unit area as discussed hereinbefore. In providing increased production it has been found advantageous to form a bottom wall of the bushing with a plurality of orifice carrying sections separated by areas which are adapted to receive mechanical supports to prevent the sagging of the increased area of the bottom wall. This again has introduced heating problems because of the temperature variations resulting from the contact of the mechanical support means with the bottom wall of the feeder.

Even without the introduction of additional heating problems because of mechanical supports the mere increase in area of a tip section over that utilized hereinbefore has emphasized the already present problem of "cold corners" on the rectangular bottom walls. These corners have been "cold" with respect to the rest of the bushing area because of the use of a substantially vertical terminal which has been connected to the middle of the end wall providing essentially a point contact area adjacent to or at the junction of the end wall and bottom wall. The electrical energy connected to the substantially vertical terminals has effected a passage through the bottom wall in a manner which did not distribute sufficient electrical energy to the corners of the rectangular bottom wall to heat the corners to a temperature which is uniform with respect to the rest of the tip section area. With the increase in the tip section area, even though a favorable width to length ratio is attempted to be maintained, it would be understood that the problem of the cold corners would be substantially increased if the means for supplying electrical energy to the bushing were still the vertical terminals or ears connected to each end wall of the bushing.

In order to correct this latter problem with respect to both types of bushings it is desirable to establish a substantially equipotential line across the end walls of the bushing, which equipotential line is parrallel with the line defined by the junction of the end wall and the bottom wall. It this can be established then it would follow that there would be substantially the same conduction of electrical energy in all areas of the bottom wall and the "cold corner" problem would be overcome. Because of the structural requirements in placing such a bushing in operation it is desirable that, even though an equipotential line be established substantially horizontally across the end wall of a bushing, there is still provided a substantially vertically extending area which is adapted to receive a connection from an electrical supply. This connection is usually in the form of adjustable clamps which may be moved up and down the vertical area to allow adjustment of distribution of the electrical energy to the terminal and thus to the bushing. Accordingly, new distribution means must be devised to satisfy the requirements of the advances in glass processing which have been discussed hereinbefore, particularly for the formation of very fine filaments or fibers which are acceptable for use in the commercial textile industries.

It is thus an object of this invention to provide an improved apparatus for processing heat-softenable material.

It is another object of this invention to provide an improved apparatus for processing heat-softenable material in which the production from a single feeder station may be increased without affecting the quality of the filaments or fibers produced from that station.

It is still another object of this invention to provide an improved apparatus for processing heat-softenable material in which a substantial uniformity of temperature may be established across a greatly enlarged tip section for increasing the production of filaments or fibers from a single station while maintaining or increasing uniformity of the quality of the filaments or fibers thus produced A further object of this invention is to provide an improved stream feeder or bushing means which utilizes a novel electrical energy distribution system for effecting desired temperatures in the walls of the stream feeder when producing filaments or fibers from molten material flowing from orificed tip sections of the stream feeder or bushing.

In accordance with the above objects the invention features a stream feeder having a bottom wall with orifices formed therein for delivering streams of molten material for attenuation into fibers and side and end walls extending upwardly from the bottom walls. Terminal means are provided on each end wall for connecting electrical energy to the feeder to heat the walls. Each of the terminal means has an inner portion adjacent to and electrically connected with an end wall for establishing an equal potential or equipotential line extending across the end wall which is substantially parallel with a line defined by the junction of the bottom and end walls. Each terminal means advantageously has an outer portion with a substantially vertically extending area which is operative to receive an electrical connection from a supply. The inner portion of the terminal means may include first and second elements which provide spaced point contacts on the end wall to define the equal potential line. The terminal means may include a plurality of elements to provide a plurality of point contacts defining the equal potential line. The plurality of elements may be joined into a single linear contact which defines the equal potential line.

In a preferred embodiment the inner portion of at least one of the terminals is constructed in the form of an inverted Y-shape having a vertical leg and diverging lower branches. The ends of the branches of the inverted Y-shape provide spaced point contacts on the end wall to define the equipotential line. The feeder may further include molten material conditioning means, such as a heater screen member, disposed within an upper portion of the feeder. The vertical leg of the inverted Y-shaped terminal is advantageously disposed adjacent to the material conditioning means to provide electrical energy for the conditioning means. The vertical leg in the branches of the inverted Y-shape may be insulated from contact with the end wall for a predetermined distance from the junction point of the legs and branches to effect a desired distribution of electrical energy on the end wall and throughout the remaining walls of the bushing. The inner portion of the inverted Y-shape terminal may be formed to avoid contact with the end walls to effect the insulation just described. In the preferred embodiment a terminal may be formed from two plate members, the plate members being joined in side-by-side relationship for a predetermined distance to form the vertical leg of the inverted Y-shape. The plate members may be diverged for the remainder of their lengths to form the lower branches thereof.

In alternative embodiments the inner portion may comprise a plurality of spaced outwardly extending ears connected to the end wall and joined at their outer extremities by a cross member. The outer portion of such a terminal may comprise a vertically extending member joined to the cross member. In still another embodiment of the terminals described herein the inner portion of the terminal may comprise a horizontally extending member joined to the end wall along the equipotential line. The outer portion of this embodiment then may be formed from an outward extension of the horizontal inner portion which has been twisted substantially 90 degrees with respect to the inner portion to provide a substantially vertically extending electrical connection area.

Other objects, features and advantages will become more apparent when the following description is taken in conjunction with the accompanying drawings, in which:

FIG. 3 is an end elevational view of a first embodiment of the teachings of this invention;

FIG. 4 is a side elevational view of the embodiment illustrated in FIG. 3;

FIG. 5 is a plan view of the embodiment illustrated in FIG. 3;

FIG. 6 is a side elevational view of an alternative embodiment of the teachings of this invention;

FIG. 7a is a plan view of the embodiment illustrated in FIG. 6;

FIG. 7b is a plan view of an alternate configuration for the principle illustrated in FIGS. 6 and 7a;

FIG. 7c is a plan view of a still further configuration for the principle illustrated in FIGS. 6 and 7a;

FIG. 8 is a side elevational view of still another embodiment of the teachings of this invention;

FIG. 9 is a plan view of the embodiment illustrated in FIG. 8; and

FIG. 10 is an end elevational view of the embodiment illustrated in FIG. 8.

While the method and apparatus of the invention have particular utility in the processing of mineral fibers, such as glass, for forming fibers or filaments from streams of glass, it is to be understood that the method and apparatus of this invention may be employed wherever it may be found to have utility.

Figure 1:
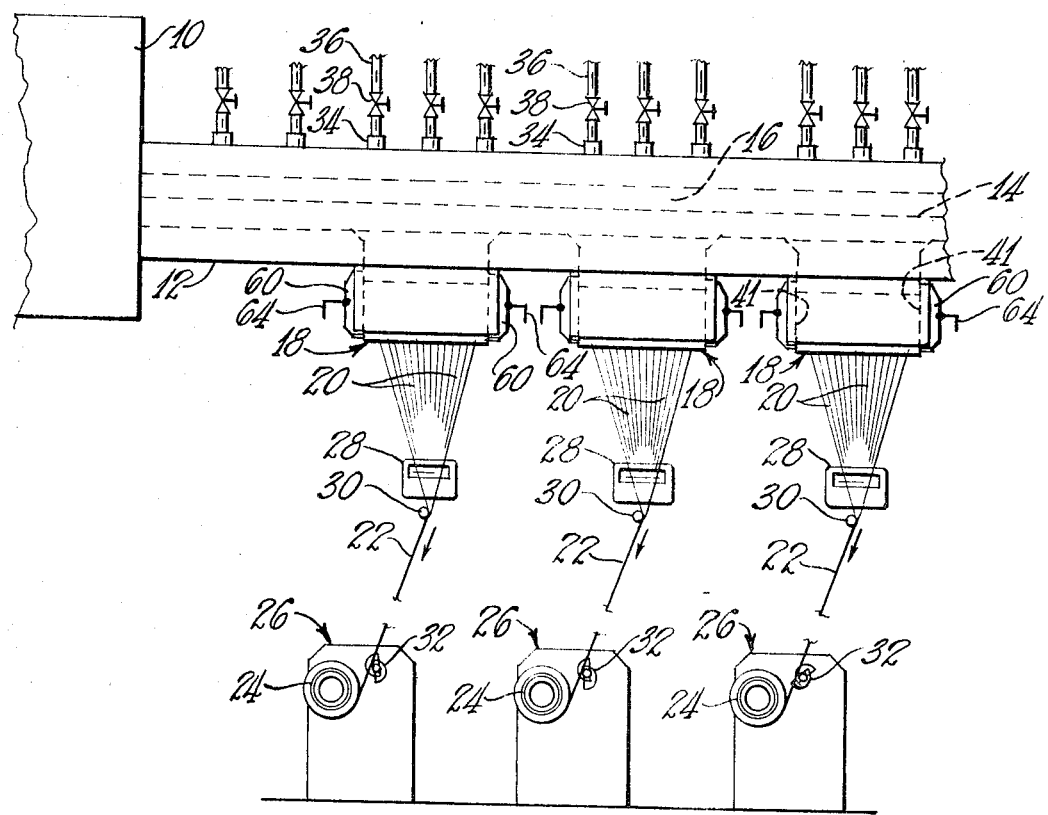
FIG. 1 is a semi-schematic elevational view of a forehearth and bushing arrangement for use with the teachings of this invention.

Referring to the drawings in detail, FIG. 1 is a semischematic elevational view illustrating a forehearth construction of a direct melt system for supplying heat-softened glass to a plurality of stream feeders or bushings associated with the forehearth. The glass batch is introduced into a melting and refining furnace or tank 10 at an end region of the furnace opposite the forehearth 12 which is connected with the melting and refining furnace.

The glass batch is reduced to a flowable or molten condition in the furnace 10 and the molten glass is traversed to the furnace 10 to effect a refining of the glass whereby refined glass 14 is delivered from the furnace into the forehearth channel 16 lengthwise of the forehearth. The glass is processed to render it suitable for attenuation into filaments or fibers. Spaced lengthwise along the forehearth 12 are stream feeders or bushings 18.

The floor or tip section of each feeder or bushing is provided with orifice means through which flow streams of glass attentuated into filaments 20 by winding a strand 22 of the filaments upon a rotating collector 24 of the winding machine 26 of conventional construction, there being a winding appaaruts for the filaments derived from each feeder.

The streams may be attenuated into fibers or filaments by other attenuating methods. An applicator 28 may be provided for each group of filaments for delivering binder or coating material onto each group of filaments. The filaments of each group are converged into a strand by gathering shoe 30. During winding of the strand on a collector 24 a rotatable and reciprocable traverse means 32 engages the strand for distributing the strand lengthwise on a collector 24 to form a package. During winding, the rotation of the traverse 32 oscillates the strand 22 to cause the individual wraps or convolutions of strand to be collected on the collector in crossing relation in a conventional manner.

The glass in the forehearth is maintained in a flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

Illustrated in FIGS. 3, 4 and 5 is an embodiment of the new family of bushings discussed hereinbefore. Each bushing 18 is inclusive of a bottom wall 48 having orificed tip means 50 formed therein, side walls 40 and end walls 41. The bushing is preferably fashioned of an alloy of platinum and rhodium or other suitable metallic material capable of withstanding the high temperatures of molten glass and of corrosion resistant characteristics. The depending projections or tips 50 are generally tubular and provide an orifice through which flows a stream 19 of glass. In this embodiment the chamber defined by the side walls 40 and end walls 41 of the feeder is preferably of greater depth than its width although the disposition of conditioning heating means and/or the construction of the side walls to improve the capacity of the bushings may reduce the desirability of maintaining a particular width to depth ratio. In any event, the bushing should have sufficient capacity in which the glass may be given a thermal treatment after entry from the forehearth channel but before reaching the lower or bottom wall 48. Extending lengthwise in the upper region of the bushing chamber is a means 56 for heating the glass in the feeder to further condition it. The heater member 56 is preferably in the form of a screen or strip having perforations 58 to accommodate glass flow therethrough. In addition to heating the glass to condition the glass and remove undesirable nonuniformities therein that have come in with the glass from the forehearth, the heater screen 56 may be utilized to selectively heat different areas or cross sections of the glass flowing down through the bushing 18 to increase or decrease viscosity so that a substantially equal velocity gradient line may be estabilshed for the glass flow just above the bottom wall of the bushing. As a further means for establishing the equal velocity gradient lines the screen or strip 56 may be utilized to mechanically divert the flow lines of the glass in the feeder to attain the equal velocity desired. The screen 56 and the converging side walls 40 cooperate in accomplishing the release of air in a bushing initially being filled in the least disruptive fashion possible and avoid the possibility of a retention of pockets of air as occurred in vertical or diverging side wall bushing structures. The converging side walls 40 afford no opportunity to have stagnant areas or pockets of glass that remain in a heated condition for an overlong period and acquire undesirable characteristics. While the heater member 56 is illustrated of V-shaped configuration it is to be understood that other configurations of heater strip or mechanical flow diverting means may be used if desired.

According to the recent developments discussed hereinbefore the glass passage from the forehearth is narrow compared to the width of the tip section area bushing and the width of the flow block passages heretofore used in conjunction with the bushings. Therefore an erosion of the refractory forming the sides of the flow passage has occurred in the past, particularly along the bottom edges thereof. This and the other problems discussed hereinbefore have been avoided in the new family of bushings since the side walls and the end walls of the bushing 18 define a top opening which is of substantially the same size as the flow passage from the forehearth. Through this arrangement each bushing is relatively thermally isolated whereby the characteristics of the glass and the bushing are substantially independent of the characteristics of the glass in the forehearth, thereby enabling accurate control of the characteristics of the glass in each bushing by the means illustrated herein independently of other bushings.

Figure 2A:
FIGS. 2a and 2b are planned view areas of prior art bushing tip sections and terminal connections illustrating problems encountered in this area.
Figure 2B:
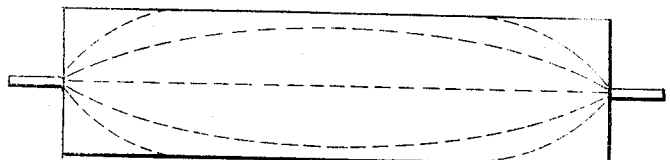

Because of the structural configuration of the new family of bushings which has an increased bottom wall or tip section area and a relatively smaller top opening which is defined by converging side walls 40 and end walls 41 the electrical distribution problem has become troublesome. Further, the mere increase in the tip section area of present bushings with respect to prior art bushings has substantially aggravated the cold corner problem which was present even in prior art bushings. This is illustrated in FIGS. 2a and 2b which graphically demonstrate the problems involved in increasing a tip section area while utilizing the prior art substantially vertical terminal ears or lugs which are connected to end walls of a bushing. It is to be noted that the centrally located terminal lugs or ears in the smaller prior art bushing illustrated in FIG. 2a provide essentially a point contact which distributed electrical energy in a manner that even then left the corners of the tip section cold with respect to the remainder of the tip section area. However, since the tip section area was so long with respect to the width involved, the cold corners were relatively small and contributed little in the way of nonuniformities in the fibers or filaments being drawn therefrom. However, as illustrated in FIG. 2b when either the length or the width is substantially increased the cold corner problem is exaggerated past the proportion of increase in length or width. When the most advantageous structural change to afford an increase in production is to increase the width dimension the cold corner problem is accordingly even more exaggerated, as illustrated in FIG. 2b. Therefore, the increase in tip section area alone, as well as the particular structural configuration shown for the new family of bushings illustrated in FIGS. 3, 4 and 5 requires a new approach to electrical energy distribution in an end wall of a stream feeder or bushing.

The terminal means indicated generally at 60 in FIGS. 3, 4 and 5 has an inner portion adjacent to and electrically connected with the end wall 41 for establishing an equipotential line extending across the end wall which is substantially parallel with the line defined by the junction of the bottom and end walls. The terminal is constructed in the form of an inverted Y-shape having a vertical leg 61 and diverging lower branches 62 and 63. The ends of the branches 62, 63 of the inverted Y-shape provides spaced point contacts on the end wall 41 to define the equal potential line desired therebetween. While it may be desirable in some instances to completely diverge the branches 62 and 63 so that they form a substantially horizontal line which is perpendicular to the vertical leg 61, it is in this instance, with the particular bushing shown, desirable to maintain the inverted Y-shape so that a desired distribution of electrical energy is effected to the side walls 40 of the bushing as well as to the bottom wall 48. Further in some instances it may be desirable to extend the branches 62, 63 to the edges of the end wall 41 to define an equipotential line that extends clear across the end wall 41. However, again with respect to the construction of the bushing illustrated in FIGS. 3, 4 and 5 it is desirable to terminate the equipotential line short of the edges of the end wall 41 because the construction at the edges of the bottom wall 48 is such that hot spots may occur at the welds and bends at the side edges of bottom wall 48. This may be compensated for by terminating the branches 62 and 63 short of the edges of the end wall 41. Further, because the construction of the bushing illustrated in FIGS. 3, 4 and 5 provides for a center support 67 of refractory material to prevent mechanical sagging of the bottom wall 48 and since the center support 67 is cooled by a fluid carrying conduit 68 associated therewith it is desirable to diverge the branches 62 and 63 at substantially the angle shown in order to compensate for the thermal upset condition caused by the juxtaposition of the mechanical support 67 with the bottom wall 48.

The terminal construction illustrated in FIGS. 3, 4 and 5 is the most desirable construction since it provides an inverted T-shape or Y-shape that distributes electrical energy to heat the walls of the bushing as required and which is also mechanically the most stable of the terminal constructions known heretofore. Further, it is possible to form the terminal 60 by joining plates 61a and 61b in a side-by-side relationship to form the vertical leg 61 and by bending the remaining portions of the plate 61a and 61b away from each other to form the branches 62 and 63.

In dealing with metals such as the platinum and rhodium alloys which are preferably used it is desirable to use rolled or rod type plate materials to obtain the greatest strength. It is desirable whenever possible to form a shape from such alloy by bending a plate or rolled type of material rather than welding separate elements or sections together to form a desired shape since welds may produce structural weaknesses in stream feeders. The weaknesses appear not in the welds themselves but in the metal adjacent to the welded areas when the bushings are operating at the extremely high temperatures involved. Further electrical distribution is effected since hot spots generally occur along welded paths or areas so that the distribution of energy is effected thereby. Thus a mechanically stable terminal may be formed as just discussed in the construction of terminals 60 which provides an equipotential line or substantially equal energy distribution in a bottom wall of a bushing while effecting a desired heating in the end and side walls of the bushing. Because of the mechanical constructions presently necessary for associated forehearth and feeder arrangements it is desirable to have a vertically extending area on the outer portion of the terminal for the connection thereto of adjustable terminal clamps which conducts the electrical energy from a supply thereof to the terminals. It is further desirable to have this area for receiving the adjustable clamps established vertically so that one may determine during the adjustment of the clamps the amount of adjustment to effect a desired change in electrical distribution. In the arrangement illustrated herein current is supplied to each terminal through a bus bar 64 connected with a current supply of comparatively high amperage and low voltage.

The vertical leg 61 of the terminal 60 is necessary in the comparatively deeper bushing illustrated to provide the distribution of electrical energy for heating the end walls and side walls and is preferably disposed adjacent to a central portion of a heater screen 56 for distribution of current thereto for the conditioning of the glass within the bushing. The glass in the deeper bushing may thus be increased above the temperature of the glass in the forehearth but the temperature of the glass in the bushing should not exceed the maximum temperature of the melt in the furnace 10 as "reboiling" will occur.

As an additional feature of the terminal arrangement illustrated in FIGS. 3, 4 and 5 the vertical legs and the branches of the inverted Y-shape may be insulated from contact with the end wall for a predetermined distance from the junction point of the legs and branches to effect a desired distribution of electrical energy on the end wall. This may be accomplished (as best seen in FIGS. 4 and 5) by forming the inner portion of the terminal 60 with a cut out 65 which extends from the junction of the branches and vertical leg for a desired distance. The cut out 65 provides insulation from the end wall of the bushing at this crucial area so that a different distribution of electrical energy may be provided by the terminal 60. This distribution may be varied in the vertical leg 61 and in each of the branches 62 and 63 with respect to the entire bushing by enlarging the cut out area 65 in the direction desired.

Referring to FIGS. 6 and 7a there is illustrated a terminal arrangement in which the inner portion of a terminal generally indicated at 70 comprises a plurality of spaced and outwardly extending ears 71, 72 and 73. The bottom of each of the outwardly extending ears 71, 72, 73 are substantially equidistant from the junction of the end wall and the bottom wall of the bushing construction shown and an equipotential line is established which is parallel to the definition line. Thus a substantially equal distribution of electrical energy occurs through the bottom wall of the bushing illustrated in FIGS. 6 and 7. The outwardly extending ears may be connected or joined at their outer extremities by cross member 74. As an alternative embodiment of that shown, the outer ears 71 and 73 may be slanted toward each other and, in conjunction with the vertically extending terminal clamp area 75, may form a Y-configuration. In either embodiment it is necessary only that the outer legs 71 and 73 are connected to the end wall to form a substantially equipotential line above the junction line of the bottom wall and end wall and spaced from the side walls the distances desired. The vertically extending member 75 is connected to the cross member 74 to afford an area to receive a vertically adjustable terminal clamp.

The construction illustrated in FIGS. 6 and 7a is best suited for a comparatively shallow bushing in which it is desired to provide substantially equal heating for the bottom wall or orifice tip section of the bushing but in which the depth of the bushing is not sufficient to allow the use of a terminal such as illustrated in FIGS. 3, 4 and 5. Although an additional ear 72 is illustrated it should be noted that the ear 72 may be eliminated or that a plurality of ears similar to 72 may be distributed between the outside ears 71, 73 to afford a plurality of point contact areas to define the equipotential line desired.

Referring to FIGS. 7b and 7c there are shown alternative configurations of the principle embodied in FIGS. 6 and 7a. In FIG. 7b the inner portion of the terminal arrangement generally indicated at 70b comprises two spaced and outwardly extending ears 71b and 73b. These ears are joined at their outer extremities by cross member 74b. It will be noted that there is no centrally located ear as is shown at 72 of FIG. 7a. This allows cross member 74b to be bowed or bent inwardly toward the middle of the end wall of the bushing, so that when a vertically extending terminal portion 75b is attached to member 74b, much less space is utilized. This is very important in some bushing installation arrangements, both from a space viewpoint and in providing room for adjustment of a terminal clamp on vertical member 75b. It should also be recognized that the outwardly extending ears of FIGS. 7a and 7b may be shortened in some cases to provide more working room.

In FIG. 7c only the two outwardly extending ears 71c and 73c have been provided. A terminal clamp means 77 is used having ear receiving and clamping portions 78 and 79 which are individual to ears 71c and 73c, respectively. The main body 77 serves as a common connection for supplying power to each ear. Alternatively, power could be supplied separately to each ear.

As in the embodiment illustrated in FIG. 7a the legs or ears 71b, 73b and 71c, 73c are connected to the end wall to form a substantially equipotential line above and generally parallel to the junction line of the bottom wall and end wall and spaced from the side walls the distrances desired. By spacing the ears upwardly on the end wall from the bottom wall, the radiating effect shown in the single connections of FIGS. 2a and 2b may be utilized in the end walls above the bottom wall to spread the effect of the power current. That is the ears do not have to be connected on the end wall even with the side walls, to establish an equi-temperature condition in the bottom wall, since there will be a radiating effect at each end of the equipotential line. Further, because of the welds along the bottom and side walls, one wants to space the ears inwardly on the end wall from the side walls to compensate for the extra heat dissipated and generated in the welds beween the side and bottom walls.

Referring to FIGS. 8, 9 and 10 there is illustrated still another embodiment of this invention in which a plurality of point contacts have been joined by providing a single linear contact as the inner portion of the terminal 80. That is, the inner portion 81 makes electrical contact along the entire length of the equipotential line desired since the inner portion 81 comprises a horizontally extending member joined to the end wall along the equipotential line. In order to obtain a substantially vertical terminal contact clamping area 82 an outward extension of the horizontal inner portion may be twisted substantially 90 degrees with respect to the inner portion 81 to provide the clamping area desired. Again, it is preferable to work with material which is of the rolled or plate type stock in forming the terminal 80. However, in some circumstances a terminal of the special construction of that illustrated in FIG. 8 may be best formed through a casting process.

The invention thus particularly improves the processing and conditioning of glass for forming fine continuous attenuated filaments as it enables the delivery of streams of more uniform size from one or several bushings by reason of the high degree of thermal stability which has been established in the bottom wall of the bushing to enable the drawing of more fine filaments, which filaments maintain substantially uniform diameters and strength characteristics.

It is apparent that within the scope of the invention modifications and different arrangements may be made other than is herein disclosed and the present disclosure is illustrative merely, the invention comprehending all variations thereof.

We claim:

1. A feeder having a bottom wall with orifices formed therein for delivering streams of molten material for attenuation into fibers and side and end walls extending upwardly from said bottom wall, all of said walls being electrically conductive, and terminal means on each end wall for connecting electrical energy to said walls to heat said walls, each of said terminal means having an inner portion adjacent to and electrically connected with an end wall, each said terminal means having contact member means on said inner portion in a line extending substantially across said end wall parallel with a line defined by the junction of the bottom and end walls to provide an equipotential line across the end wall.

2. A feeder as defined in claim 1 in which said inner portion comprises a horizontally extending member joined to said end wall along said equipotential line.

3. A feeder as defined in claim 2 in which an outer portion of said terminal is formed from an outward extension of said horizontal inner portion twisted substantially 90 degrees with respect to said inner portion.

4. A feeder having a bottom wall with orifices formed therein for delivering streams of molten material for attenuation into fibers and side and end walls extending upwardly from said bottom wall, and terminal means on each end wall for connecting electrical energy to said feeder to heat said walls, each of said terminal means having an inner portion adjacent to and electrically connected with an end wall for establishing an equipotential line extending across said end wall substantially parallel with a line defined by the junction of the bottom and end walls, each terminal means having an outer portion with a substantially vertically extending area to receive an electrical connection, said inner portion of at least one of said terminals being constructed in the form of an inverted Y-shape having a vertical leg and diverging lower branches, the ends of the branches of the inverted Y-shape providing spaced point contacts on said end wall to define said equipotential line.

5. A feeder as defined in claim 4 which further includes molten material conditioning means disposed within an upper portion of the feeder and in which said vertical leg of said terminal is disposed adjacent thereto to provide electrical energy for said conditioning means.

6. A feeder as defined in claim 5 in which said conditioning means comprises a heater screen member.

7. A feeder as defined in claim 4 in which the vertical leg and the branches of said inverted Y-shape are insulated from contact with the end wall for a predetermined distance from the junction point of said leg and branches to effect a desired distribution of electrical energy on said end wall.

8. A feeder as defined in claim 7 in which said inner portion is formed to avoid contact with said end wall to effect the insulation.

9. A feeder as defined in claim 4 in which said one of said terminals is formed from two plate members, said plate members being joined in side-by-side relationship for a predetermined distance to form said vertical leg, said plate members being diverged for the remainder of their lengths to form said lower branches.

10. A feeder having a bottom wall with a plurality of stream delivering sections separated by areas for receiving mechanical support to prevent sagging, said feeder having side walls which converge toward each other and end walls all extending upwardly from said bottom wall, and terminal means on each end wall for connecting electrical energy to said feeder to heat said walls, each of said terminal means having an inner portion adjacent to and electrically connected with an end wall for establishing an equipotential line extending across said end wall substantially parallel with a line defined by the junction of the bottom and end walls, at least one of said terminals being constructed in the form of an inverted Y-shape having a vertical leg and diverging lower branches, the ends of said branches contacing said end wall providing spaced point contacts to define said equipotential line.

11. A feeder as defined in claim 10 which further includes molten material conditioning means disposed within an upper portion of the feeder and in which said vertical leg of said terminal is disposed adjacent thereto to provide electrical energy for said conditioning means.

12. A feeder as defined in claim 10 in which the vertical leg and the branches of said inverted Y-shape are insulated from contact with the end wall for a predetermined distance from the junction point of said leg and branches to effect a desired distribution of electrical energy on said end wall.

13. A feeder as defined in claim 12 in which said inner portion is formed to avoid contact with said end wall to effect the insulation.

14. A feeder as defined in claim 10 in which said one of said terminals is formed from two plate members, said plate members being joined in side-by-side relationship for a predetermined distance to form said vertical leg, said plate members being diverged for the remainder of their lengths to form said lower branches.

15. A feeder having a bottom wall with orifices formed therein for delivering streams of molten material for attenuation into fibers and side and end walls extending upwardly from said bottom wall, all of said walls being electrically conductive, and terminal means on each end wall for connecting electrical energy to said walls to heat said walls, an inner portion of each said terminal means including a plurality of ears extending outwardly from an end wall, the inner portions of said ears being connected to said end wall in a spaced relationship to provide separate spaced contact members which establish an equipotential line parallel to a line formed by the junction of said end wall and said bottom wall.

16. A feeder as defined in claim 15 in which said outwardly extending ears are joined at their outer extremities by a cross member.

17. A feeder as defined in claim 16 which further includes a vertically extending member joined to said cross member for receiving a terminal clamp.

18. A feeder as defined in claim 17 in which said cross member is bowed inwardly toward said end wall and in which bow configuration said vertically extending member is joined to said cross member to provide a compact terminal arrangement.

References Cited

UNITED STATES PATENTS

| | | | |
|---|---|---|---|
| 2,417,913 | 3/1947 | Cornelius | 13—6 |
| 2,649,487 | 8/1953 | Phillips | 13—6 |
| 3,416,906 | 12/1968 | Glaser | 65—1 |

S. LEON BASHORE, Primary Examiner

R. L. LINDSAY, Jr., Assistant Examiner

U.S. Cl. X.R.

13—6, 18; 65—1; 219—10.81